United States Patent [19]
Tabourier

[11] 3,810,177
[45] May 7, 1974

[54] MONOPULSE RADAR RECEIVER
[75] Inventor: Remy Tabourier, Paris, France
[73] Assignee: Thomson-CSF, Paris, France
[22] Filed: Sept. 29, 1972
[21] Appl. No.: 293,539

[30] Foreign Application Priority Data
Oct. 1, 1971  France .............. 71.35478

[52] U.S. Cl. ......,..................... 343/16 M
[51] Int. Cl. .......................... G01s 9/22
[58] Field of Search ................. 343/16 M

[56] References Cited
UNITED STATES PATENTS
3,560,974  2/1971  Lecourtier et al. ........... 343/16 M
3,495,246  2/1970  Schoneborn .................. 343/16 M
3,680,102  7/1972  Poinsard ....................... 343/16 M
3,566,407  2/1971  Trippe .......................... 343/16 M Primary Examiner—Maynard R. Wilbur
Assistant Examiner—G. E. Montone
Attorney, Agent, or Firm—Cushman, Darby & Cushman

[57] ABSTRACT

The present invention relates to the receivers used in multi-beam, recurrent pulse ranging systems. In accordance with the invention, in a receiver comprising two variable-gain amplifiers, one of which is for the sum signal $\Sigma$ and the other for the difference signal $\Delta$, it is arranged that with one recurrence among a plurality thereof, the sum signal is supplied to the difference amplifier and the gain control device AGC is then supplied with the sum signal from the output of that amplifier. The synchronous demodulator D supplies the signal $K \cdot \Delta/\Sigma$ independent of the respective gains of the sum and difference amplifiers K being the reference AGC value.

7 Claims, 7 Drawing Figures

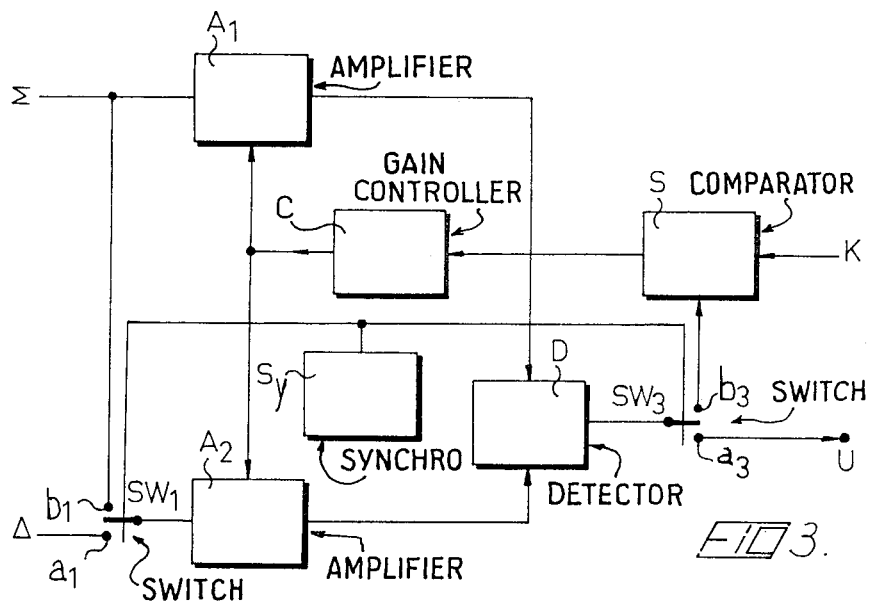
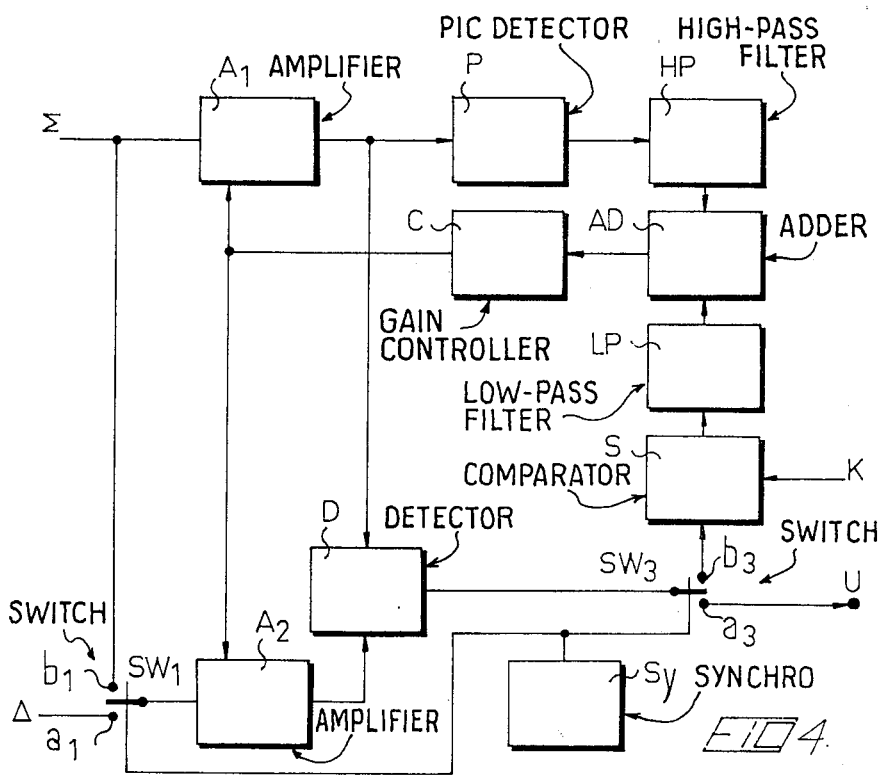

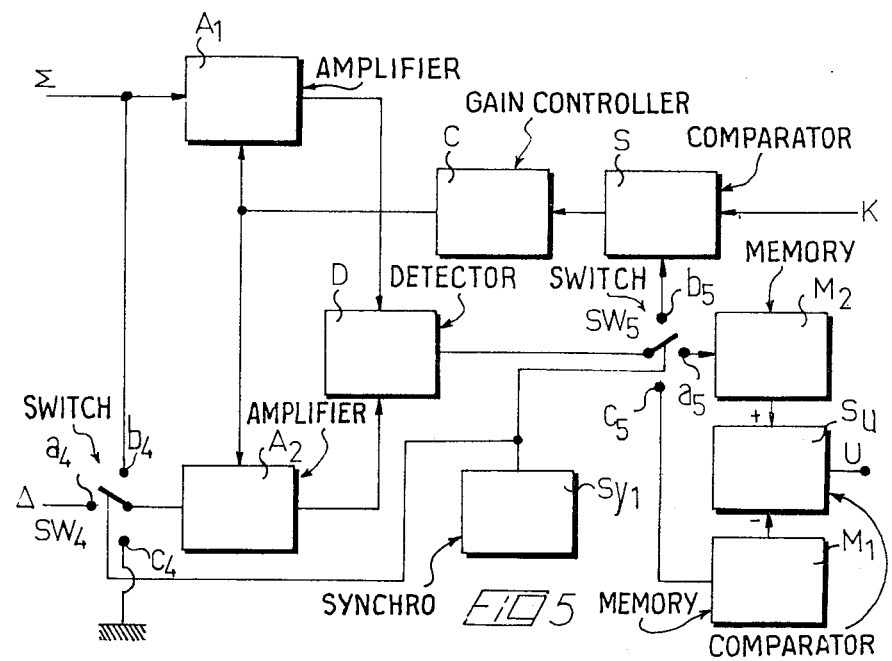
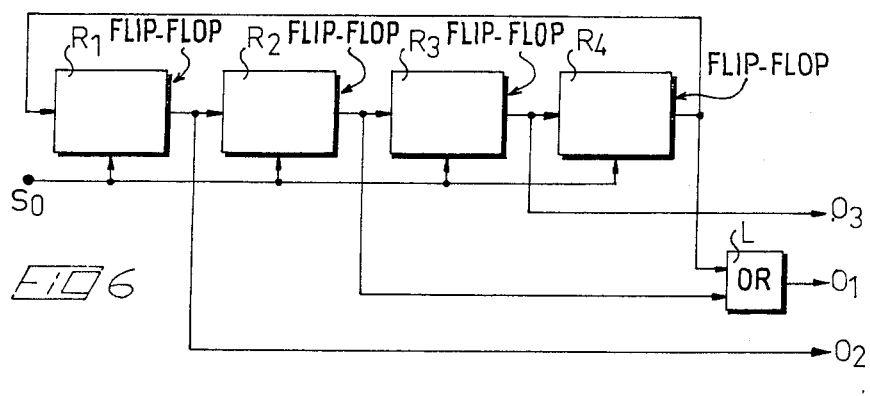

MONOPULSE RADAR RECEIVER

BACKGROUND OF THE INVENTION

The present invention relates to the receivers of recurrent pulse radar ranging systems. These systems, which have multibeam antennas for determining a direction, are utilised in particular for the angular tracking of targets and an angular direction is determined with the help of "sum" and "difference" signals generated from the received signals corresponding to the different signals.

The known receivers of this kind comprise input receiver circuits supplying the sum signal $\Sigma$ to a variable-gain amplifier known as the "sum amplifier," and a difference signal $\Delta$ to a second variable-gain amplifier known as the "difference amplifier." The two amplifiers are connected by their outputs to a synchronous demodulator and an automatic gain control circuit which comprises in particular, in series, a circuit for comparing the amplitude of the sum signal, after amplification, with that of a fixed reference signal, and a gain control circuit supplying the same control signal for both amplifiers.

It has been proposed (U.S. Pat. No. 3,378,849) that a single, controlled-gain intermediate frequency amplifier should be used and the signals of the sum and difference channels transmitted across this using a conventional time-division multiplex technique. However, this solution is not applicable to pulse systems unless the pulses are coherent, that is to say formed from one and the same carrier wave.

SUMMARY OF THE INVENTION

The object of the present invention is a receiver circuit which is applicable likewise to non-coherent pulse systems. The system furthermore has the advantage that it is simpler in operation, and introduces fewer parasitic components. It is based upon the recognition that the variations in the level of a plurality $n$ of consecutive signals received from one and the same target, are sufficiently small to make it possible to use the same gain for these signals, in the receiver circuits; the measurements of level, carried out for purposes of automatic gain control, will thus be effected during a pulse but over a received time or period which is longer than the pulse duration. Moreover, this measurement is effected on the sum signal after amplification by the difference amplifier.

According to one feature of the invention, the receiver furthermore comprises at least one switching device making it possible to transmit the sum signal intended for the automatic gain control circuit, through the difference amplifier during one recurrence among a plurality $n$ thereof.

It will be understood, of course, that the difference signal can itself be made up of several "difference" signals, time-division multiplexed in a manner known per se.

BRIEF DESCRIPTION OF THE DRAWING

The invention will be better understood from a consideration of the description which now follows and the related figures amongst:

FIGS. 3, 4 and 5 illustrate diagrams of improved recievers in accordance with the invention;

FIG. 6 is an embodiment of one of the elements of FIG. 5; and

FIG. 7 is an explanatory diagram.

DESCRIPTION OF THE INVENTION

In the following, it has been assumed that the sum signals $\Sigma$ and difference signals $\Delta$, picked up by the antenna or antennas have been previously processed in a conventional manner (frequency-changing, constant-gain pre-amplification, range gating, etc. . . ).

Figure 1:
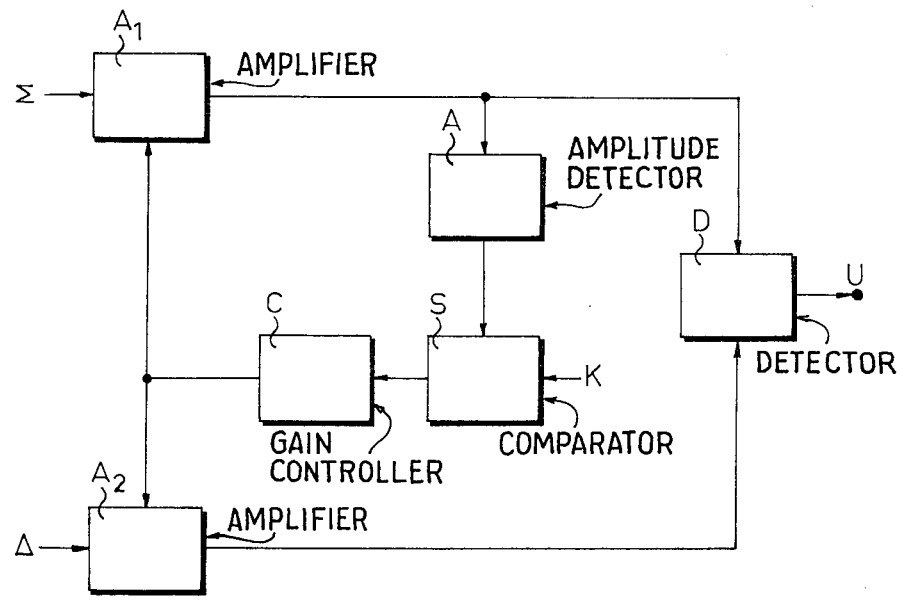
FIG. 1 illustrates the block diagram of a conventional two-channel receiver.

They are then applied, as FIG. 1 shows, respectively to the two amplifiers A1 and A2 having respective gains g1 and g2 capable of control, the amplifiers having characteristics which are as far as possible identical and being coupled to a synchronous demodulator D which supplies to the terminal U the video ranging signal.

The output level of A1, after amplitude detection in A, is maintained at a constant value K by an automatic gain control device comprising a control circuit proper, C, supplied with the output signal from a comparator or subtractor S, one input of which is supplied with the output signal from the amplitude detector A and the other input maintained at a fixed reference level K.

The control signal is also applied to the amplifier A2. The output signal from the sum amplifier A1 being constant, the output signal from the synchronous demodulator D is a function solely of the output signal from the difference amplifier A2. Thus, at the output of the amplifier A1, we have: $\Sigma \cdot g1 = K$ thanks to the automatic gain control (K is a constant), and, at the output of the amplifier A2:

$$\Delta \cdot g2 = (g2/g1) \Delta \cdot g1 = (g2/g1) K \cdot \Delta/\Sigma$$

equal to $K \cdot \Delta/\Sigma$, if g2/g1 is at all times equal to unity whatever the gain control voltage. The difficulty lies precisely in the design of two amplifier circuits A1 and A2 which will satisfy this condition or, at any rate, will enable the ratio g2/g1 to be kept constant.

In addition, it is not certain that the two circuits: amplitude detector A, serving for automatic gain control (AGC), synchronous demodulators D producing the ranging signal or output signal to the output terminal U, will exhibit the same output characteristics vis-a-vis the signal g1 $\cdot$ $\Sigma$, in the case of the first, and g2 $\cdot$ $\Delta$ in the case of the second. Account must be taken of the differences in characteristics, in dissymmetry of g1 and g2. In other words, it is necessary to take into account all the gains occurring between the inputs and the two points of measurement which serve respectively for AGC in the one case and for ranging in the other.

However, in the case of recurrent signals, the gains of the amplifiers can be maintained constant for signals coming from one and the same target. Also, in accordance with the invention, it is possible to escape the effects of variations in the gain ratio g1 and g2, by from time to time (one recurrence among a plurality $n$) amplifying the signal $\Sigma$ across the amplifier A2. On the occasion of this same recurrence, the output signal from A2 is used to supply the AGC. Under these conditions, it is now $\Sigma \cdot g2$ which is equal to K and the output produces $K \cdot \Delta/\Sigma$ which is independent of g2/g1 provided that g1 and g2 are such that the AGC voltage maintains A1 in the linear zone of amplification of the input signal Σ. This condition is much less restricted than that of absolute invariance of the ratio of the gains of the two amplifiers.

Figure 2:
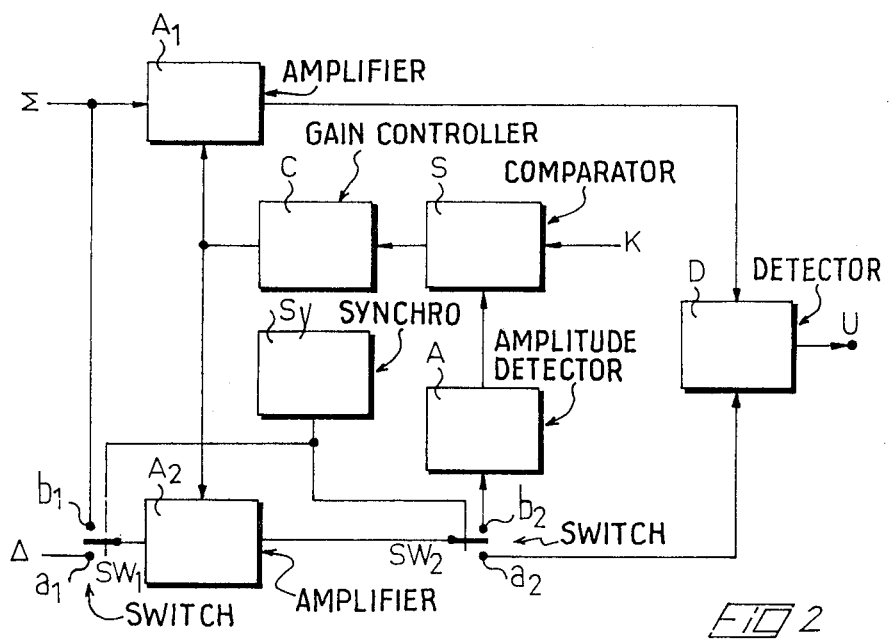
FIG. 2 illustrates the general block diagram of a receiver in accordance with the invention.

The circuit shown in FIG. 2 is a general block diagram of a receiver in accordance with the invention. Like the conventional circuit shown in FIG. 1, it comprises two variable gain amplifiers A1 and A2, a synchronous demodulator D and a gain control circuit, but here the amplitude detector is no longer supplied by the amplifier A1 which is either out of circuit or supplied by the amplifier A2 which then, and only then, receives the signal Σ: to this end, two synchronised switches, SW1 and SW2, are arranged in the receiver circuit. The switch SW1 selectively applies the signal Δ (position a1) or the signal Σ (position b1) to the amplifier A2; the switch SW2 selectively applies the output signal from the amplifier A2 to the synchronous demodulator D (position a2) or to the amplitude detector A (position b2) of the AGC. Since the switches are synchronised, it is the signal Δ which is applied to the synchronous demodulator across the switch SW2 and the signal Σ which is applied to the amplitude detector.

The switches are controlled by a synchronising device Sy in order that they are in the "control" position (contacts b1 and b2 closed) with one recurrence in every $n$ ($n$ being a whole number, equal for example to echoes processed per target), and in the "measurement" position (contacts a1 and a2) for the remainder of the time.

No more elaborate discussion will be made here of the design of th synchronising device Sy, which is controlled by the general synchronisation device of the system, this latter device supplying the recurrence control signals and consisting, for example, of a frequency-divider dividing by $n$, the switches then being in the "measurement" position in the absence of any signal at the output of the block Sy, and in the "control" position, in the presence of a signal.

FIG. 3 illustrates a detector circuit in accordance with the invention, operating on the principle illustrated in FIG. 1, but of simpler design and more reliable operation, detection of the amplitude of the signal Σ, required for operation of the AGC, being effected by means of the same synchronous demodulator D. The detector A has been discarded and the switch SW2 replaced by a switch SW3 having contacts a3 and b3, arranged after the synchronous demodulator, this new switch being synchronised with the switch SW1 and coupling the output of the demodulator either to the output terminal U (position a3 synchronised with a1) or to the comparator device of the AGC; in addition to the fact that the problem of identical detection characteristics is removed, ipso facto, another advantage of this circuit is that the second switch transmits video frequency signals whilst the switch SW2, which is handling medium frequency signals, is of more complex design. The circuit shown in FIG. 4 illustrates an improvement on that of FIG. 3, the response of the gain control circuit being faster there because of the fact that at the input of the control circuit C, there is permanently injected, at AD, a signal obtained from the signal Σ at the output of the amplifier A1, by peak detection in P and filtering in a high-pass filter HP; the regulation of the direct component of the signals is effected throughout by the signal Σ, amplified in A2, due to the presence of the high-pass filter in the output channel of A1; a correcting filter (low-pass filter) LP can advantageously be arranged between the comparator S and the adder AD.

FIG. 5 illustrates another improvement to the circuit of FIG. 4 (also applicable to the preceding circuits) relating to the case where the measuring circuit of the ranging system has a marked false zero, this improvement can make it possible to measure said false zero in order to take account of it at the expense of a recurrence during which the amplifier A receives no signal.

To this end, the two-way switches SW1 and SW3 of FIG. 3 and 4 are replaced by synchronised switches SW4 and SW5 respectively, each with three positions a4, b4, c4 and a5, b5, c5; the positions a4, b4 on the one hand and a5, b5 on the other, are identical to the positions a1, b1 and a3, b3 respectively; in the position c4, the amplifier A2 is coupled to the zero potential whilst at position c5 the demodulator is coupled to the "minus" input of a subtractor Su whose other input is coupled to the terminal a5 and whose output supplies the output terminal U.

The signal appearing at the terminal c5 represents the false zero which is derived from the measurement signal appearing at the terminal a5. It will be clear that the two terms of the subtracting operation are stored by appropriate devices (M1, M2) (low-pass filter, box car or the like), since the two measurements are not simultaneous.

In practice, the three-way switches are often in the form of three simple contact-breakers operated cyclically. In this case, the contact-breaker assigned to terminals c5, and the store M1, can be replaced by a box car circuit. The two-way or three-way switches hereinbefore referred to are constituted, for example, by similar gates. The output switches (SW2, SW3, SW5) can also be constituted by several box cars; this solution is particularly advantageous in the case of FIG. 5 since it makes it possible to dispense with the store M1.

The generator used to produce the control signals for the gates or, more generally, the switches, can, for example, be a feedback shift-register (ring-divider, described for example in "circuits logiques et automatismes a sequence" by NASLIN, Edition DUNOD 1965, paragraphs 13.2.4).

In FIG. 6, an example of a divider by four, suitable for the device SY1 of FIG. 5, has been shown; it comprises four bistable trigger stages R1, R2, R3, R4 in series, the output at the last one R4 being coupled to the signal input of the trigger stage R1. The outputs of the trigger stages R2 and R4 are coupled to the inputs of an OR-gate, L, the control signals to the switches (output signals at SY1) corresponding respectively to the positions a, b, c being available at O1, at the output of the OR-gate, at O2 at the output of the trigger stage R1, and at O3 at the output of the trigger stage R3; FIG. 7 is a diagram which, at 71, 72, 73 illustrates the signals at O1, O2, O3 respectively, as a function of time; it has been assumed that the shift control input for the trigger stages receives the radar sync. signals So indicated at 70.

What is claimed is:

1. In a monopulse system having receiving antenna means, input means for supplying sum and difference signals from recurrent pulses of predetermined carrier frequency reflected by extraneous objects and an output terminal for providing an output signal representing an indication of the position of such object, the combination therewith of,
- a first variable-gain-amplifier known as "sum amplifier" for amplifying said sum signal,
- a second variable-gain-amplifier known as "difference amplifier" for amplifying said difference signal,
- gain control means for supplying both amplifiers with one and the same gain control signal,
- a synchronous demodulator having a first and a second inputs connected to said sum and difference amplifiers respectively for providing said output signal,
- first switch means having two inputs and one output inserted between said input means and said difference amplifier for alternately providing sum and difference signals to said difference amplifier, said sum signal being provided to said difference amplifier during one recurrence among a plurality thereof, said sum signal being provided to said sum amplifier during at least a substantial portion of recurrences except said one and said difference signal being simultaneously provided to said difference amplifier, and
- second switch means synchronised with said first switch means inserted between said difference amplifier and said output terminal for supplying said gain-control means with said sum signal.

2. The combination defined in claim 1 wherein said second switch means is inserted between said difference amplifier and said synchronous demodulator and has one input and two outputs, said input being connected to the output of said difference amplifier, the first output being connected to the input of said gain control means, and the second output being connected to said second input of said synchronous demodulator.

3. The combination defined in claim 1 wherein said second switch means is inserted between said synchronous demodulator and said output terminal and has one input and two outputs, said input being connected to the output of said synchronous demodulator, the first output being connected to the input of said gain control means and the second output being connected to said output terminal.

4. The combination defined in claim 2 wherein said gain-control means comprises in series an amplitude detector, a comparator for comparing the amplitude of the output signal of said amplitude detector with that of a fixed reference signal, and a gain-control circuit for supplying said gain-control signal.

5. The combination defined in claim 3 wherein said gain-control means comprises in series a comparator for comparing the amplitude of the output signal of said synchronous demodulator with that of a fixed reference signal, and a gain-control circuit for supplying said gain control signal.

6. The combination defined in claim 3 wherein said gain-control means comprises on one hand in series a peak detector for detecting peaks of the output signal of said sum amplifier and a high-pass filter, on the other hand in series a comparator for comparing the amplitude of the output signal of said synchrones demodulator with that of a fixed reference signal and a low-pass filter, an adder for adding the output signals of said high-pass filter and said low-pass filter, and a gain-control circuit for supplying said gain-control signal, connected to said adder.

7. The combination defined in claim 3 wherein said first switch means has a third input for coupling the input of said difference amplifier to a zero potential during another recurrence among said plurality thereof, wherein said second switch means has a third output, wherein a first and a second store circuit for preserving the output signal of said synchronous demodulator are connected to said second and third output of said second switch means, and a substractor for comparing the output signals of said first and second store circuits is connected to said output terminal.

* * * * *